US010780398B2

(12) United States Patent
Besnault et al.

(10) Patent No.: US 10,780,398 B2
(45) Date of Patent: *Sep. 22, 2020

(54) PROCESS FOR THE REGENERATION OF AN ALKALINE SOLUTION USED IN A PROCESS FOR THE EXTRACTION OF SULPHUR-CONTAINING COMPOUNDS NOT COMPRISING A WASHING STEP

(71) Applicant: AXENS, Rueil Malmaison (FR)

(72) Inventors: Jean-Michel Besnault, Le Vesinet (FR); Mai Phuong Do, Kuala Lumpur (MY); Sebastien Ferrero, Chaville (FR)

(73) Assignee: AXENS, Rueil Malmaison (FR)

(*) Notice: Subject to any disclaimer, the term of this patent is extended or adjusted under 35 U.S.C. 154(b) by 16 days.

This patent is subject to a terminal disclaimer.

(21) Appl. No.: 15/907,388

(22) Filed: Feb. 28, 2018

(65) Prior Publication Data
US 2018/0250633 A1 Sep. 6, 2018

(30) Foreign Application Priority Data
Mar. 1, 2017 (FR) ..................... 17 51677

(51) Int. Cl.
*B01D 53/14* (2006.01)
*B01D 53/52* (2006.01)
*B01D 53/78* (2006.01)
*B01D 53/96* (2006.01)
*C02F 1/02* (2006.01)
*C02F 1/72* (2006.01)
*C10G 19/08* (2006.01)
*C10G 21/06* (2006.01)
*C10G 21/28* (2006.01)
*C10L 3/12* (2006.01)
*C02F 103/18* (2006.01)
*C02F 103/36* (2006.01)

(52) U.S. Cl.
CPC ......... *B01D 53/96* (2013.01); *B01D 53/1425* (2013.01); *B01D 53/1468* (2013.01); *B01D 53/52* (2013.01); *B01D 53/78* (2013.01); *C02F 1/02* (2013.01); *C02F 1/725* (2013.01); *C10G 19/08* (2013.01); *C10L 3/12* (2013.01); *B01D 2251/304* (2013.01); *B01D 2251/604* (2013.01); *B01D 2257/304* (2013.01); *C02F 2101/40* (2013.01); *C02F 2103/18* (2013.01); *C02F 2103/365* (2013.01); *C10L 2290/12* (2013.01); *C10L 2290/541* (2013.01)

(58) Field of Classification Search
CPC ........ B01D 53/1425; B01D 53/146852; B01D 53/78; B01D 53/96; B01D 2251/304; B01D 2251/604; B01D 2257/304; B01D 53/1468; B01D 53/52; C02F 1/02; C02F 1/20; C02F 1/72; C02F 1/725; C02F 1/727; C02F 1/74; C02F 9/00; C02F 2101/40; C02F 2103/18; C02F 2103/36; C02F 2103/365
See application file for complete search history.

(56) References Cited

U.S. PATENT DOCUMENTS

| | | | |
|---|---|---|---|
| 2,853,432 A * | 9/1958 | Gleim | .................. C02F 1/725 208/284 |
| 2,976,229 A | 3/1961 | Brown | |
| 2,988,500 A | 6/1961 | Gleim | |
| 5,354,482 A | 10/1994 | Varadi | |
| 6,387,348 B1 * | 5/2002 | Ferrell | .................. C10G 19/08 423/183 |
| 2003/0072707 A1 | 4/2003 | Ray | |
| 2004/0175307 A1 * | 9/2004 | Laricchia | .......... B01D 53/1468 422/612 |

FOREIGN PATENT DOCUMENTS

| | | |
|---|---|---|
| FR | 1254713 A | 2/1961 |
| FR | 1249134 A | 3/1961 |
| WO | 2005121279 A1 | 12/2005 |

OTHER PUBLICATIONS

Search Report FR1751677 dated Sep. 29, 2017.

* cited by examiner

*Primary Examiner* — Lucas A Stelling
(74) *Attorney, Agent, or Firm* — Millen White Zelano and Branigan, PC; Csaba Henter

(57) ABSTRACT

The present invention relates to the field of extraction of sulphur-containing compounds such as mercaptans, COS, $H_2S$ or $CS_2$ from a hydrocarbon cut. This selective extraction is carried out by bringing the hydrocarbon cut in the liquid phase into contact with an alkaline solution, for example caustic soda. The process in accordance with the invention is an improved process for the regeneration of alkaline solution which can be used to reduce the quantity of alkaline solution necessary in the regeneration section.

20 Claims, 4 Drawing Sheets

PROCESS FOR THE REGENERATION OF AN ALKALINE SOLUTION USED IN A PROCESS FOR THE EXTRACTION OF SULPHUR-CONTAINING COMPOUNDS NOT COMPRISING A WASHING STEP

CONTEXT OF THE INVENTION

The invention relates to the field of extraction of sulphur-containing compounds such as mercaptans, COS, $H_2S$ or $CS_2$ from a hydrocarbon cut. This selective extraction is carried out by bringing the hydrocarbon cut in the liquid phase into contact with an alkaline solution, for example caustic soda, in order to form mercaptide type species and salts. After extraction, the alkaline solution charged with mercaptides is regenerated.

Regeneration of the alkaline solution consists of an exothermic oxidation reaction in the presence of a catalyst converting mercaptide type species into disulphides. Said disulphides constitute a hydrocarbon phase which has low solubility in the alkaline solution. The separation of the effluents from the reactor produces, on the one hand, a partially regenerated alkaline solution, and on the other hand a hydrocarbon phase which is rich in disulphides.

The partially regenerated alkaline solution may be used directly again in the extraction section or it may be treated to extract from it the residual disulphides it contains before introducing it once again into the extractor.

The process in accordance with the invention consists of improving the process for the regeneration of the alkaline solution by reducing the excess alkaline solution used to control the rise in temperature due to the oxidation reaction. The process of the invention may thus be used to reduce the quantity of alkaline solution in the regeneration section, and thus reduce the investment costs, operating costs, and the inventory of alkaline solution and of catalyst in the regeneration section. Finally, the process in accordance with the invention can be used to increase the energy efficiency of the process.

Processes for eliminating mercaptans are used in refining for hydrocarbon cuts comprising essentially light cuts from the methane to the kerosene cut in order to transform them into upgradable products. In fact, the presence of mercaptans renders the hydrocarbon foul-smelling and unstable with a tendency to form hydrogen sulphide. Mercaptans are found in a large number of hydrocarbon feeds; examples which may be cited are feeds obtained from the distillation of crude oil, for example LPG, naphtha, gasoline or kerosene, or feeds obtained from the extraction of gas from fields or from the extraction of shale oil. Furthermore, the feeds concerned may also be obtained from a cracking unit. This list is not exhaustive.

EXAMINATION OF THE PRIOR ART

Figure 1:
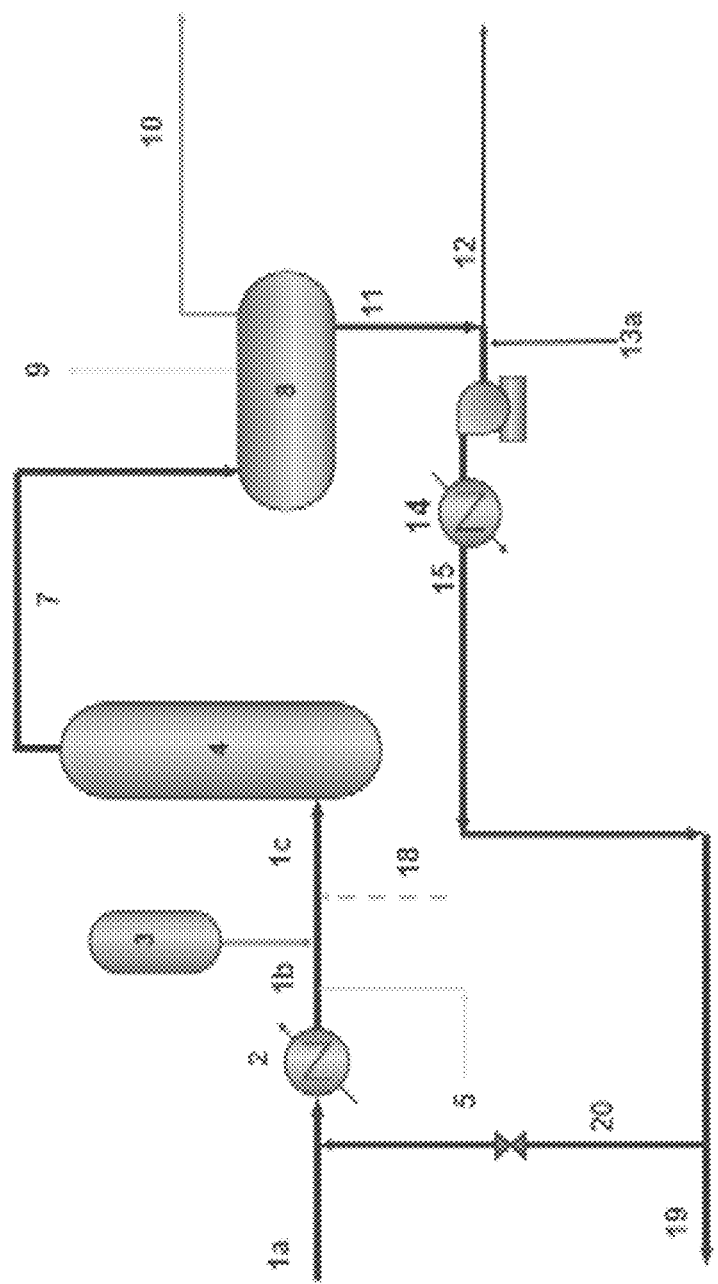
FIG. 1 represents the flow chart for the section for regeneration of the spent alkaline solution obtained from the section for extraction of sulphur-containing compounds in accordance with the prior art.

The extraction of sulphur-containing compounds from a hydrocarbon cut (gasoline, LPG, etc) by liquid-liquid extraction with an alkaline solution is well known in the prior art. When the majority of sulphur-containing species are mercaptans, or thiols, a very widely used process consists of carrying out an extraction, preferably in counter-current mode, of sulphur-containing species with the aid of an aqueous alkaline solution, in general caustic soda, which circulates in a loop in the process, as described in the U.S. Pat. No. 4,081,354.

The alkaline solution leaving the extraction section is known as the "alkaline solution which is enriched in sulphur-containing compounds" and is sent to the regeneration section. We shall refer to this below as the "alkaline solution to be regenerated" or "spent alkaline solution".

In the regeneration section, the alkaline solution to be regenerated is brought into contact in the oxidation reactor with an oxidizing agent, in general air or pure oxygen, or an oxidizing gas, in the presence of a dissolved catalyst, for example based on cobalt phthalocyanin, in order to convert the mercaptide type species into disulphides.

Mercaptides can in general be defined as salts of mercaptans, containing the ion $RS^-$, where R is an alkyl or aryl group.

The parameters associated with the oxidation reaction are selected in a manner such as to oxidize almost all of the mercaptides present in the alkaline solution into disulphides which have low solubility in the alkaline phase. Optionally, the alkaline solution could be brought into simultaneous contact in the oxidation reactor with a hydrocarbon cut which contains few or no sulphur-containing compounds, typically a desulphurized hydrocarbon cut such as a naphtha cut or a desulphurized gasoline cut, in which the disulphides formed by the reaction dissolve.

The oxidation reaction is exothermic and the temperature of the process fluid in the oxidation reactor has to be controlled. In prior art processes, the cooling means is a line which can be used to recirculate at least a portion of the regenerated alkaline solution from the outlet from the regeneration section to the inlet to the regeneration section, "by-passing", i.e. leaving out, the extraction section in its entirety. Thus, an excess of regenerated alkaline solution supplies the oxidation reactor and is used to absorb a portion of the heat released by the oxidation reaction, which means that the rise in temperature in the oxidation reactor can be controlled.

In the remainder of the text, the term "excess alkaline solution" will be used to describe the quantity of alkaline solution used to control the rise in temperature in the reactor.

More precisely, this excess is termed the "excess of recirculated alkaline solution" when the alkaline solution used to control the rise in temperature of the reactor originates from a recirculation line inside the regeneration section.

When the sulphur-containing compounds content in the feed increases, the excess alkaline solution used to absorb the heat released by the oxidation reaction increases and becomes relatively large compared with the quantity of spent alkaline solution originating from the extraction.

The excess alkaline solution used in the oxidation reactor has an impact on the total quantity of alkaline solution moving in the regeneration section. This total quantity influences the inventory of the alkaline solution in the regeneration section, and thus the investment costs and operating costs.

None of the prior art documents discloses a solution which can be used to reduce the excess alkaline solution used to control the rise in temperature of the reactor, while keeping the exothermicity identical in the oxidation reactor.

The invention differs from the prior art in that:
The flow rate of the alkaline solution in the regeneration section is reduced compared with the prior art.
The dimensions of the equipment are reduced, the investment costs are minimized and the energy performance of the process is improved.
The inventory of alkaline solution for the unit is reduced, which reduces the consumption and purge of alkaline solution during transient phases, for example start-up and stoppage of the unit.
The inventory of catalyst in the unit is reduced, which reduces the consumption and purge of catalyst during transient phases, for example start-up and stoppage of the unit.
Control of the exothermicity in the oxidation reactor is improved.

BRIEF DESCRIPTION OF THE INVENTION

The present invention consists of improving the process for the regeneration of the alkaline solution, by reducing the excess of recirculated alkaline solution, while retaining an identical exothermicity in the oxidation reactor of said regeneration section.

In accordance with the invention, an excess of recirculated alkaline solution constituted by partially regenerated alkaline solution is preferably used as the cooling means in order to control the temperature of the oxidation reactor. Said partially regenerated solution is depleted in mercaptides, but contains residual disulphides. As an example, it may be the alkaline solution which leaves the oxidation reactor after separation of the hydrocarbon phase which is rich in disulphides and cooling.

In fact, at the outlet from the oxidation reactor, the alkaline phase is separated from the hydrocarbon phase which is rich in disulphides. Said phase is constituted by disulphides alone or by a hydrocarbon cut which is rich in disulphides if a hydrocarbon cut has been injected simultaneously into the oxidation reactor leading to dissolution of the disulphides in that cut.

The alkaline solution obtained from the separation no longer contains mercaptides, but contains residual disulphides of the order of 200 ppm (by weight). It is termed the "partially regenerated alkaline solution" or, in the case in which the alkaline solution is caustic soda, "partially regenerated caustic soda".

After separation, said partially regenerated alkaline solution is cooled and may be used again in the extraction section.

The alkaline solution leaving the regeneration section is termed the "regenerated alkaline solution" or "alkaline solution depleted in sulphur-containing compounds" (known as "lean caustic"). The remainder of the text will refer to this as "regenerated alkaline solution".

The invention may advantageously be used in the context of "revamping" of the unit, i.e. an increase in its production capacity.

Thus, the present invention consists of a process for the regeneration of a spent alkaline solution used in a unit for the extraction of sulphur-containing compounds from any hydrocarbon cut.

The process for the regeneration of spent alkaline solution in accordance with the invention comprises the following series of steps:

a) sending the spent alkaline solution to be regenerated to an oxidation reactor (4) in which it is brought into contact with an oxidizing agent (5) and a catalyst (3), and optionally with a hydrocarbon cut, said spent alkaline solution having been heated by means of an exchanger (2) to a temperature typically in the range 40° C. to 50° C., and in which the rise in temperature is controlled by a cooling means constituted by an excess alkaline solution sent directly to said reactor, at one or more points, b) sending the effluents from the oxidation reactor (4) to a separator (8) from which a hydrocarbon phase which is rich in disulphides (10) and a partially regenerated alkaline solution (11) are extracted, c) cooling the partially regenerated alkaline solution (11) obtained from step b) to a temperature of 45° C. or less.

In accordance with a first variation, the process furthermore comprises the following step:

d) dividing the cooled partially regenerated alkaline solution (15) obtained from c) into two streams:
a first stream (22a) which constitutes the excess of the recirculated alkaline solution and which is sent to the oxidation reactor (4), and
a second stream (22b).

In accordance with another preferred variation, the excess alkaline solution is constituted by fresh alkaline solution.

In accordance with another variation, the point or points for the introduction of the excess alkaline solution into the oxidation reactor (4) are provided with a distribution means or a mixing means.

In accordance with another variation, the point or points for the introduction of the excess alkaline solution into the oxidation reactor (4) are positioned in a manner such as to allow the rise in temperature of said reactor to be controlled.

In general, the catalyst employed in the oxidation reactor is of the cobalt or vanadium phthalocyanin type. In general, the catalyst employed in the oxidation reactor is added to the alkaline solution at the inlet to the oxidation reactor in a manner such as to obtain a concentration of catalyst in the alkaline solution in the range 10 to 1000 ppm by weight, preferably in the range 10 to 500 ppm by weight.

The oxidation reactor (4) may be equipped with a supplemental cooling means (23), in addition to the injection of the excess alkaline solution.

The excess alkaline solution may be cooled to a temperature which is at least 5° C. lower than that of the cooled partially regenerated alkaline solution (15) before being returned to the oxidation reactor (4).

In the regeneration process in accordance with the present invention, the hydrocarbon cut treated in the unit for extraction of sulphur-containing compounds may range from methane or kerosene.

The unit for the regeneration of a spent alkaline solution used in a unit for the extraction of sulphur-containing compounds from a hydrocarbon cut in accordance with the invention comprises at least:

a piece of equipment (2) for heating the spent alkaline solution before it is introduced into the oxidation reactor (4) to a temperature in the range 40° C. to 50° C., an oxidation reactor (4) in which the spent alkaline solution is brought into contact with an oxidizing agent (5) and a catalyst (3), a conduit for injecting an excess alkaline solution directly into the oxidation reactor (4) at one or more points, constituting the cooling means used to control the rise in temperature of said reactor, a separator (8) supplied with the effluent obtained from the oxidation reactor (4), from which a hydrocarbon phase which is rich in disulphides (10) and a partially regenerated alkaline solution (11) are extracted, a cooling means (14) for cooling the partially regenerated alkaline solution (11) obtained from the separator to a temperature of 45° C. or less.

In accordance with a first variation of the unit for the regeneration of spent alkaline solution in accordance with the invention, the conduit for injecting the excess alkaline solution directly into the oxidation reactor (4) is supplied with a fresh alkaline solution.

In accordance with another variation of the unit for regenerating spent alkaline solution in accordance with the invention, the conduit for injecting the excess alkaline solution directly into the oxidation reactor (4) is supplied with a partially regenerated alkaline solution (22a) obtained by dividing the cooled partially regenerated alkaline solution (15) into two streams:

a first stream (22a) which constitutes the recirculated excess alkaline solution and which is returned to the oxidation reactor (4), a second stream (22b).

In accordance with another variation of the unit for the regeneration of spent alkaline solution in accordance with the invention, the oxidation reactor is equipped with a supplemental cooling means (23).

In accordance with another variation of the unit for the regeneration of spent alkaline solution in accordance with the invention, a supplemental cooling means may be used to cool the recirculated excess alkaline solution to a temperature which is at least 5° C. lower than that of the cooled partially regenerated alkaline solution (15).

DETAILED DESCRIPTION OF THE INVENTION

The present invention concerns a process for the extraction of sulphur-containing compounds present in a hydrocarbon cut, in the case in which the major sulphur-containing species are mercaptans, denoted RSH, for example methanethiol $CH_3SH$, ethanethiol $C_2H_5SH$, propanethiol $C_3H_7SH$, and in which other sulphur-containing species may also be present, such as hydrogen sulphide $H_2S$ or carbon oxysulphide, COS.

The feed of spent alkaline solution to be treated is supplied continuously to the regeneration section and returned continuously to the extraction section. It may optionally originate from different distinct extraction sections and return there following regeneration. In the regeneration section, the alkaline solution is supplied and purged, either discontinuously (batch or discontinuous process) or constantly (continuous process), in order to keep its quality constant.

In accordance with the invention, the excess of partially regenerated alkaline solution recirculated to the oxidation reactor in order to control the rise in temperature is generally available at a temperature of 45° C. or less, typically in the range 10° C. to 45° C., preferably in the range 35° C. to 45° C., downstream of the cooling means (14), typically an exchanger.

In general, the purge of the partially regenerated alkaline solution and the corresponding makeup of fresh alkaline solution are carried out upstream of the cooling means (14). This makeup and this purge may be either continuous or intermittent. The excess of recirculated alkaline solution may thus be a mixture of fresh alkaline solution and partially regenerated alkaline solution.

In accordance with a first variation of the invention, an excess alkaline solution (22a) is sent to the oxidation reactor, directly into one or more points of said reactor.

Each injection point may advantageously be equipped with a distribution device such as an injection array, or optionally with a mixing device of the quench box type. A distribution device may be used to distribute the excess alkaline solution in a homogeneous manner in the reactor. In addition, a mixing device may be used to mix the excess alkaline solution and the stream contained in the reactor. Each injection point may be provided with another equivalent type of device. The oxidation reactor may be provided with one or more thermocouples or with any equivalent means in order to measure the temperature, in order to adjust the flow rate or flow rates of excess alkaline solution to be introduced at each of the injection points, using a rule for controlling the rise in temperature in the reactor.

The flow rate for injection of the recirculated alkaline solution may be controlled by using the temperature measurements made upstream and downstream of the oxidation reactor.

The excess alkaline solution injected into the reactor may derive from a recirculation of alkaline solution or in fact from a stream deriving from outside the regeneration section.

In accordance with a third variation of the invention, the oxidation reactor is provided with a supplemental cooling means, typically a piece of equipment (23) which can be used to directly cool the stream moving in the oxidation reactor (4) in a manner such as to further reduce the excess alkaline solution used.

This piece of equipment (23) may typically be an exchanger or any equivalent means, for example a side exchanger, a hairpin or a coil installed in the reactor, a circulating reflux, or a jacket around the reactor. This list is not exhaustive. The cooling fluid may be a stream which is internal to the unit, or a stream which is external to the unit or a cold utility, for example water, or a specific coolant fluid. This third variation is compatible with the first variation and second variation of the present invention.

In accordance with another variation of the invention, the recirculated excess alkaline solution may be cooled using a supplemental cooling means such as an additional exchanger or equivalent equipment, to a temperature which is at least 5° C. lower than that of the cooled partially regenerated alkaline solution (15), typically to a temperature in the range 10° C. to 40° C., preferably in the range 10° C. to 35° C.

Finally, in accordance with a further variation of the invention, the excess alkaline solution is replaced by adding an excess of oxidizing agent, for example air or oxygen, upstream of or directly into the oxidation reactor via at least one injection.

The various variations of the invention may be combined when designing the unit. They may be operated simultaneously or in alternation. Thus, the unit may on the one hand be provided with a recirculation line in order to send an excess of recirculated alkaline solution to one or more points of the oxidation reactor (4), and on the other hand with an oxidation reactor (4) provided with cooling equipment (23).

In accordance with the invention, for an identical temperature rise in the oxidation reactor, the excess alkaline solution in the regeneration section is reduced compared with the prior art, which means that the investment necessary to construct these units can be minimized and the energy efficiency of the process can be improved, and thus the corresponding operating cost effects.

This part of the description provides information regarding the extraction section which is not the subject matter of the present invention, but is provided for ease of comprehension.

The feed to be treated, comprising sulphur-containing compounds, may initially enter a pre-treatment section constituted, for example, by a pre-treatment vessel pre-filled with an alkaline solution, typically caustic soda diluted to a concentration in the range 2% to 10% by weight. The alkaline solution in the pre-treatment vessel is renewed in accordance with an operating cycle which is in the range 3 to 30 days, depending on the age of the solution. The pre-treatment extracts a variable quantity of sulphur-containing species, including mercaptans. Depending on the units, it is possible to provide different pre-treatment flow charts with, for example, at least two pre-treatments operating in parallel, or in fact a continuous purge/makeup system for each section. This list is not exhaustive.

The hydrocarbon feed then enters an extraction section, conventionally a counter-current extraction signal. The hydrocarbon cut is supplied to the bottom of the column. Said extraction column is also supplied with a regenerated alkaline solution, typically caustic soda, at the head of the column. The concentration of caustic soda is then in the range 5% to 25% by weight, preferably in the range 13% to 17% by weight. The alkaline solution may also contain polar organic solvents, for example of the dialkyl sulphoxide, amino-alcohol, amino-hydroxyalkyl, ether, alkylamine, alkylpolyamine or alkylamide type, alone or as a mixture. More generally, the alkaline solution may contain hydroxides of alkali metals, but also hydroxides of alkaline-earth metals and weak bases.

The extraction section acts to extract the majority of the mercaptans present in the hydrocarbon feed. In fact, the mercaptans form mercaptides in the present of the alkaline solution which are preferentially dissolved in the aqueous alkaline solution, and as a result are extracted from the hydrocarbon feed. The hydrocarbon feed which is thus refined leaves the column via the column head.

The alkaline solution leaving the extraction section is charged with mercaptides, for example with species of the sodium thiolate type, RS-Na, corresponding to the mercaptans which have been extracted, dissociated and recombined with sodium ions, $Na^+$, if the alkaline solution is caustic soda.

Oxidation of the alkaline solution charged with mercaptides leaving the extraction section may be carried out in various types of equipment known as an oxidation reactor or oxidizer. Said reactor is generally a vertical drum supplied via the bottom, designed so as to bring the oxidizing agent, generally in the gaseous state, into contact with the alkaline solution charged with mercaptides in the liquid phase, and optionally with a hydrocarbon phase, also in the liquid phase.

The technology often used for the oxidation reactor is that of a packed column, for example packed with Raschig rings or Pall rings or other types of packing. The oxidation reaction is exothermic and the temperature of the process fluid in the oxidation reactor has to be controlled. In fact, a minimum temperature is necessary so that the oxidation reaction can be triggered. However, the temperature of the process has to be controlled so that it is in the optimum operating range.

Figure 2:
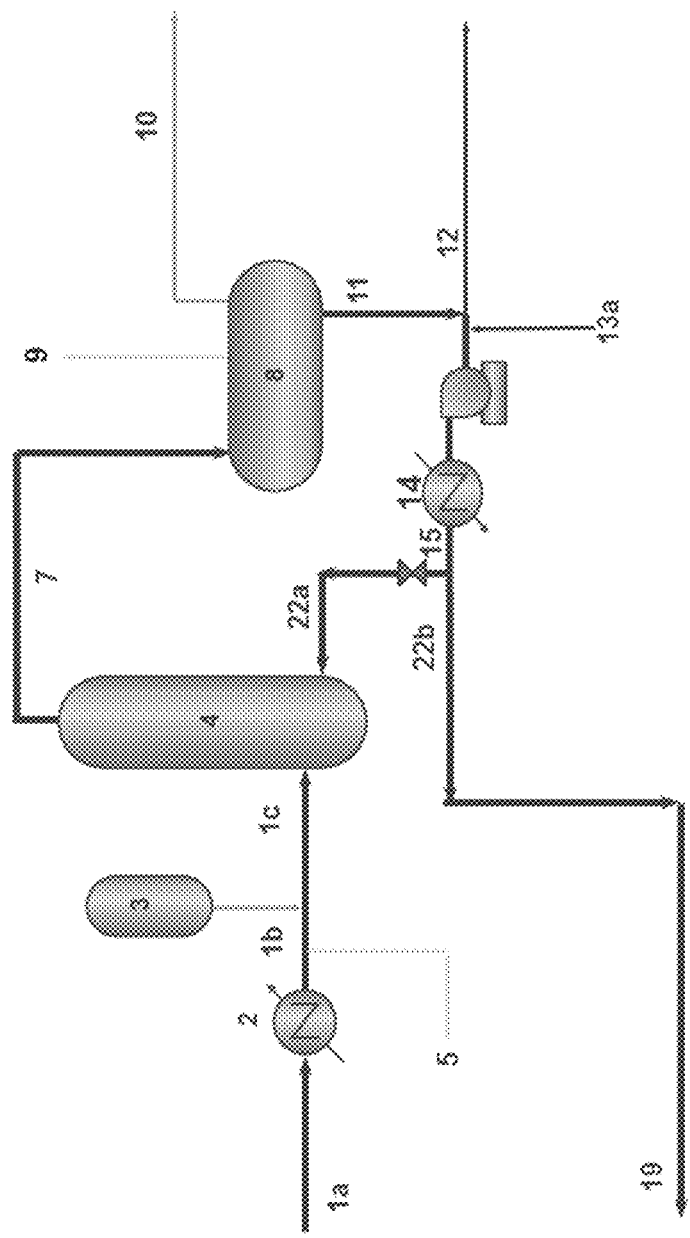
FIG. 2 represents the flow chart for the section for regeneration of the spent alkaline solution obtained from the extraction section in accordance with the invention in a first variation.
Figure 3:
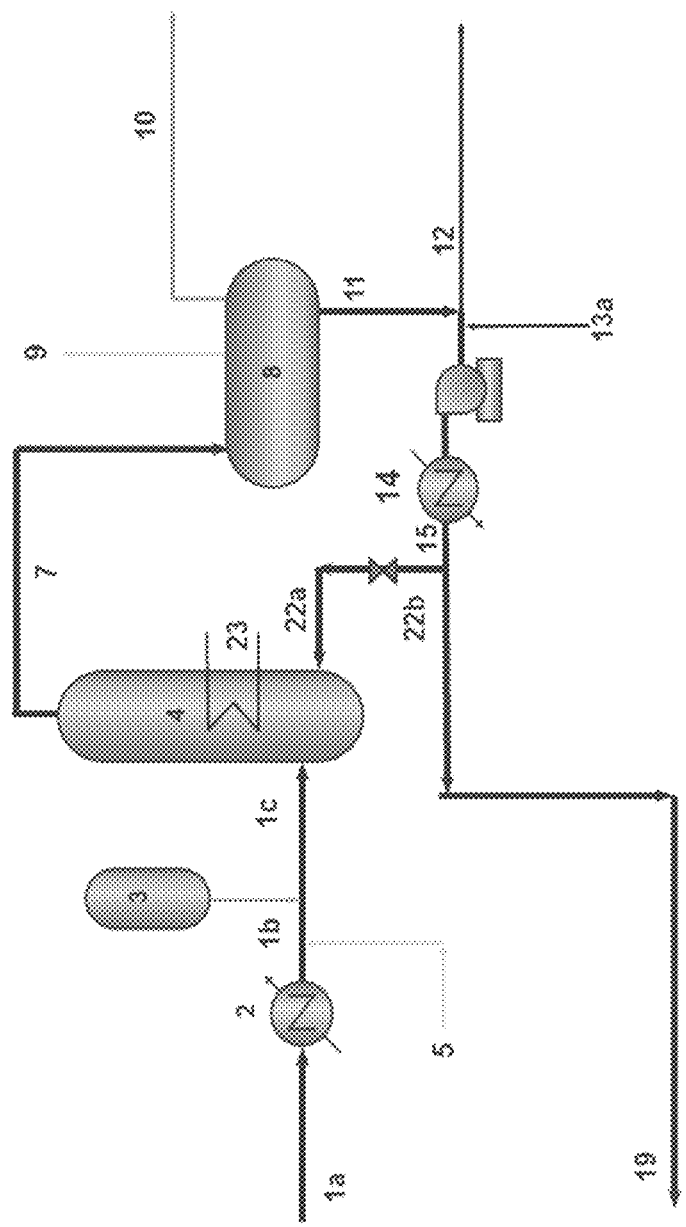
FIG. 3 represents the flow chart for the section for regeneration of the spent alkaline solution obtained from the extraction section in accordance with the invention in a second variation.
Figure 4:
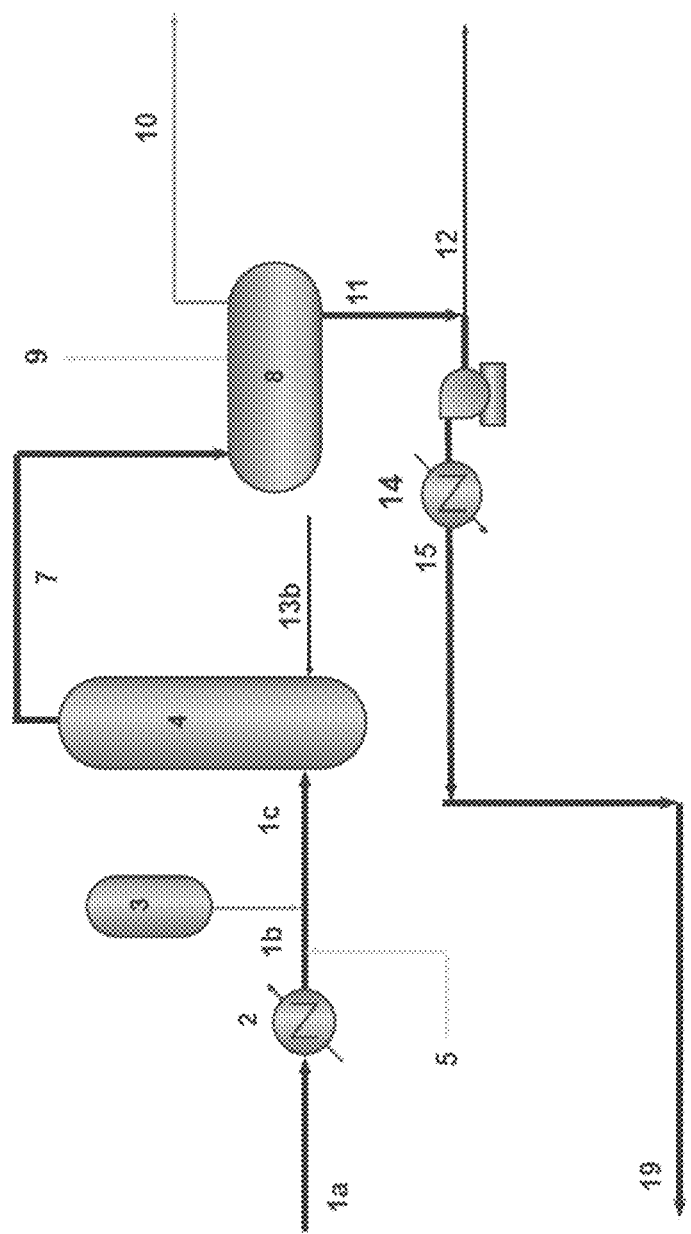
FIG. 4 represents the flow chart for the section for regeneration of the spent alkaline solution obtained from the extraction section in accordance with the invention in a third variation.

The accompanying figures are flow charts of the regeneration section in accordance with the prior art (FIG. 1) and in accordance with the invention in its different variations (FIGS. 2, 3 and 4). Streams or equipment with the same meanings in the prior art and in accordance with the present invention bear the same reference number.

FIG. 1 illustrates the flow chart for the prior art regeneration section. The stream of alkaline solution to be regenerated (1a) is typically heated to between 40° C. and 50° C. and preferably between 42° C. and 47° C. in an exchanger (2), in general with industrial steam, or in an equivalent piece of equipment, before adding air via the conduit (5) and catalyst via the conduit (3), then the stream (1c) enters into an oxidation reactor (4). The presence of a dissolved catalyst (3) in the alkaline solution promotes the reaction for oxidation of the mercaptides into disulphides, denoted RSSR'. The catalyst used may be from the phthalocyanin family. The phthalocyanins of metals such as cobalt, iron, manganese, molybdenum or vanadium may be employed. Preferably, cobalt or vanadium phthalocyanins are used. Because metallic phthalocyanins are not soluble in the aqueous medium, their sulphonated derivatives such as phthalocyanin trisulphonate or tetrasulphonate are generally used in the oxidation reactor.

Other catalysts may also be used. The catalyst is added to the alkaline solution at the inlet to the oxidation reactor in a manner such as to obtain a concentration of catalyst in the alkaline solution in the range 10 to 1000 ppm by weight, preferably in the range 10 to 500 ppm by weight. The disulphides are insoluble in the alkaline phase. Optionally, a hydrocarbon cut (18) is injected into the spent alkaline solution, for example upstream of the oxidation reactor (4), via the conduit (6) in the stream (1b). This hydrocarbon stream concentrates the disulphides produced during the oxidation reaction.

The pressure at the head of the oxidation reactor is in the range 0.1 to 1.0 MPa, preferably in the range 0.45 to 0.65 MPa.

The polyphasic medium leaving the oxidation reactor (4) via the conduit (7) is sent to a separator drum (8) ("disulphides separator drum"). The separator drum (8) may be replaced by any physical means for separation of a gas phase, a hydrocarbon phase and an aqueous phase. In said drum, a gas phase, a hydrocarbon phase which is rich in sulphur-containing species of the disulphide type which is purged via the conduit (10), and a partially regenerated alkaline solution (11) containing a quantity of residual disulphides, typically of the order of 200 ppm by weight, are separated out. The excess oxidizing agent, depleted in oxygen, leaves the separator drum (8) via the conduit (9).

A portion of the partially regenerated alkaline solution (11) is purged via the conduit (12) to keep the concentration of the alkaline solution constant so as to maintain the quality of the extraction. In fact, a portion of the alkaline solution is consumed by secondary reactions which in particular produce salts, for example the salts $Na_2CO_3$ and $Na_2S$. The corresponding makeup of fresh alkaline solution is carried out via the conduit (13a).

After the purge and makeup, the partially regenerated alkaline solution is then cooled by a cooling means (14), typically an exchanger operating with cooling water, or an equivalent piece of equipment such as, for example, an air-cooled exchanger or an exchanger using a cooling fluid other than industrial water, at a temperature of 45° C. or less, preferably in the range 35° C. to 45° C.

The cooled partially regenerated alkaline solution (15) is then divided into two streams:

- a stream (19) which may be sent to the extraction section, and
- a stream (20) which is sent to the inlet to the regeneration section, by-passing the entire extraction section.

The stream (20) constitutes an excess of partially regenerated alkaline solution which supplies the oxidation reactor and which is used as a cooling means to absorb a portion of the heat released by the oxidation reaction, and to control the rise in temperature in said reactor.

FIG. 2 illustrates a variation of the present invention, in which a line (22a) can be used to return an excess of the alkaline solution recirculated to the oxidation reactor (4) in order to control its temperature rise. The point of arrival for the stream (22a) is located in the oxidation reactor (4) itself and may consist of one or more points of arrival. In the case in which several introduction points are employed, the flow rate of the recirculated excess alkaline solution to each of the points may optionally be varied in accordance with a rule which can be used to control the rise in temperature right along the oxidation reactor (4).

FIG. 3 illustrates a variation of the present invention which can be used to further reduce the excess of recirculated alkaline solution (22a) used to control the temperature in the oxidation reactor (4). In fact, by equipping this reactor with a supplemental cooling means such as an exchanger (23) or any other equivalent means, the flow rate of the recirculated excess alkaline solution returned to the oxidation reactor (4) via the line (22a) can be further reduced.

FIG. 4 illustrates a variation of the present invention, in which the makeup of fresh alkaline solution (13b) is carried out directly into the reactor, at one or more points, and not into the circuit for the partially regenerated alkaline solution (11). This injection constitutes the cooling means for controlling the rise in temperature in the oxidation reactor (4).

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 1751677, filed Mar. 1, 2017 are incorporated by reference herein.

EXAMPLES OF THE INVENTION

The invention will be better understood from the following comparative examples.

A unit for the extraction of mercaptans present in a LPG type hydrocarbon phase, a mixture of alkanes containing 2, 3, 4 and 5 carbon atoms, was considered. The hydrocarbon feed to be treated was from a condensates distillation unit. It had a flow rate of 13.2 t/h and had the following composition:

TABLE 1

Properties of the feed

| Properties | | % by weight |
|---|---|---|
| Ethane, | % by wt | 0.3 |
| Propane, | % by wt | 18.3 |
| Butane, | % by wt | 77.2 |
| Pentane, | % by wt | 2.2 |
| Impurities | | |
| $H_2S$, | ppm by wt | 5000 |
| COS | ppm by wt | 225 |
| Methylmercaptans, | ppm by wt | 9000 |
| Ethylmercaptans, | ppm by wt | 5625 |
| Propylmercaptans, | ppm by wt | 150 |

It is considered that a pre-washing section is present upstream of the extraction section and that $H_2S$ and COS have been completely eliminated.

The alkaline solution employed to carry out this extraction was caustic soda.

For all of the examples, the flow rate of regenerated caustic soda (19) which supplied the extraction section was 3.9 t/h, with a caustic soda content of 15% by weight and a temperature of 40° C. After reaction with the sulphur-containing compounds, the spent caustic soda (1a), i.e. enriched in sulphur-containing compounds, obtained from the outlet from the extraction section (thus at the inlet to the regeneration section) had a caustic soda content of 10.7% by weight and a flow rate of 4.1 t/h.

For all of the examples, the consumption of fresh caustic soda (13a) was zero and the quantity of partially regenerated caustic soda (12) purged was also zero (intermittent function of purge-makeup).

Example 1

This example is in accordance with the prior art. The process of the prior art is represented by the flow chart of FIG. 1. An excess of recirculated caustic soda of 9.1 t/h constituted by totally regenerated caustic soda at 40° C. bypassing the extraction section via the line (20) was used to control the rise in temperature in the reactor and obtain a difference in temperature of 9° C. between the inlet and the outlet for the oxidation reactor (4).

The excess of caustic soda "bypassing" the extraction section via the line (20) was mixed with the spent caustic soda from the extraction section (1a). The mixture was then heated to 45° C. in an exchanger (2) before adding air via the line (5) (0.2 t/h) and catalyst (3), then entering the oxidation reactor (4). The quantity of catalyst injected was intended to maintain the concentration of catalyst at 250 ppm by weight in the alkaline solution which returned to the reactor.

The oxidation reactor (4) was operated at 0.59 MPa at the reactor head. At the outlet from the oxidation reactor, the caustic soda no longer contained sodium thiolates and was saturated with dissolved oxygen.

The exchanger (2) acting to heat the spent caustic soda mixture to 45° C. and totally regenerated alkaline solution consumed 70 kW, and the exchanger (14) for cooling the partially regenerated caustic soda acting to cool it from 54° C. to 40° C. consumed 197 kW.

The total flow rate of caustic soda moving in the oxidation reactor (4) was 13.4 t/h.

The quantity of hydrocarbon phase rich in disulphides (10) which was purged was 0.2 t/h.

Example 2

The process in accordance with the invention was simulated in accordance with the variation described in FIG. 2.

The oxidation reactor (4) was operated under the same pressure and temperature conditions as in Example 1.

The spent caustic soda (1a) was heated to 45° C. in the exchanger (2) before adding air via the line (5) (0.2 t/h) and catalyst (3), then it entered the oxidation reactor (4).

An excess of recirculated caustic soda (22a) of 6.7 t/h, constituted by partially regenerated caustic soda, was sent directly to the oxidation reactor (4) in order to control the rise in temperature in the reactor and obtain a temperature difference of 9° C. between the inlet and the outlet for the oxidation reactor (4).

The exchanger (2) acting to heat the enriched caustic soda to 45° C. consumed 23 kW, and the exchanger (14) for cooling the partially regenerated caustic soda acting to cool it from 54° C. to 40° C. consumed 161 kW. The saving in utilities for the heat exchangers was 31% compared with the utilities consumed for this equipment in Example 1.

The flow rate for the caustic soda moving in the oxidation reactor and at the inlet to the separator drum (8) was 11 t/h. Thus, the flow rate moving in these sections was reduced by 18% compared with the flow rate of Example 1. The size of the equipment of these sections was thus reduced by 18%, which reduced the inventory for the catalyst and for the alkaline solution of the unit.

The quantity of hydrocarbon phase rich in disulphides (10) which was purged was 0.2 t/h.

Example 3

The process in accordance with the invention in this variation is represented in FIG. 3. An excess of recirculated caustic soda (22a) was fixed at 0.1 t/h.

The spent caustic soda (1a) was heated to 45° C. in the exchanger (2) before adding air via the line (5) (0.2 t/h) and catalyst (3), then it entered the oxidation reactor (4).

The exchanger (2) consumed 23 kW. The oxidation reactor (4) was operated under the same pressure and temperature conditions as in Example 1. The oxidation reactor was provided with a coil (23) located in the oxidation reactor and supplied with industrial water which was used to cool the process fluid. This coil absorbed an 86 kW quantity of heat.

Using the coil and the excess recirculated caustic soda (22a) meant that the rise in temperature in the reactor could be controlled and a difference of 9° C. could be obtained between the inlet and the outlet for the reactor, as in the preceding examples.

The flow rate for the caustic soda moving in the oxidation reactor (4) and at the inlet to the separator drum (8) was 4.3 t/h. Thus, the flow rate moving in these sections was reduced by 68% compared with the flow rate of Example 1, and by 61% compared with the flow rate of Example 2. The size of the equipment in these sections was thus correspondingly reduced. The inventory of the catalyst and the alkaline solution of the unit were also reduced.

The exchanger for cooling the partially regenerated caustic soda (14) acting to cool it from 54° C. to 40° C. consumed 63 kW.

The saving in utilities consumed in the unit was 36% compared with the utilities consumed in Example 1, and identical to that of Example 3.

The quantity of the hydrocarbon phase rich in disulphides (10) which was purged was 0.2 t/h.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the regeneration of a spent alkaline solution from a unit for the extraction of sulphur-containing compounds from a hydrocarbon cut, comprising:
    a) sending the spent alkaline solution to an oxidation reactor (4) in which it is brought into contact with an oxidizing agent (5) and a catalyst (3), and optionally with a hydrocarbon cut, said spent alkaline solution having been heated to a temperature in the range of 40° C. to 50° C., and in which the rise in temperature is controlled by cooling by using a cooled partially regenerated alkaline solution,
    b) sending effluents from the oxidation reactor (4) to a separator (8) from which a hydrocarbon phase which is rich in disulphides (10) and a partially regenerated alkaline solution (11) are extracted, and
    c) cooling the partially regenerated alkaline solution (11) obtained from step b) to a temperature of 45° C. or less to obtain the cooled partially regenerated alkaline solution,
    wherein the cooled partially regenerated alkaline solution is supplied directly to said oxidation reactor at one or more points.

2. The process for the regeneration of a spent alkaline solution from a unit for the extraction of sulphur-containing compounds from a hydrocarbon cut as claimed in claim 1, further comprising:
    d) dividing the cooled partially regenerated alkaline solution (15) obtained from c) into two streams:
        a first stream (22a) is sent to the oxidation reactor (4) and serves as the cooled partially regenerated alkaline solution supplied directly to said oxidation reactor, and
        a second stream (22b).

3. The process for the regeneration of a spent alkaline solution as claimed in claim 1, further comprising adding fresh alkaline solution to the partially regenerated alkaline solution.

4. The process for the regeneration of a spent alkaline solution as claimed in claim 1, in which the one or more points for the introduction of the cooled partially regenerated alkaline solution into the oxidation reactor (4) are provided with a distribution means or a mixing means.

5. The process for the regeneration of a spent alkaline solution as claimed in claim 1, in which the one or more points for the introduction of the cooled partially regenerated alkaline solution into the oxidation reactor (4) are positioned in a manner such as to allow the rise in temperature of said oxidation reactor to be controlled.

6. The process for the regeneration of a spent alkaline solution as claimed in claim 1, in which the catalyst in the oxidation reactor (4) is a cobalt or vanadium phthalocyanin catalyst.

7. The process for the regeneration of a spent alkaline solution as claimed in claim 1, in which the catalyst in the oxidation reactor is added to the alkaline solution at an inlet to the oxidation reactor in a manner such as to obtain a concentration of catalyst in the alkaline solution in the range of 10 to 1000 ppm by weight.

8. The process for the regeneration of a spent alkaline solution as claimed in claim 1, in which the oxidation reactor (4) further comprises a supplemental cooling means (23).

9. The process for the regeneration of a spent alkaline solution as claimed in claim 1, in which the cooled partially regenerated alkaline solution (15) is further cooled by at least 5° C. before being returned to the oxidation reactor (4).

10. The process for the regeneration of a spent alkaline solution as claimed in claim 1, in which the hydrocarbon cut treated in the unit for extraction of sulphur-containing compounds comprises methane or kerosene.

11. The process for the regeneration of a spent alkaline solution as claimed in claim 1, in which the one or more points for the introduction of the cooled partially regenerated alkaline solution into the oxidation reactor (4) are provided with a distributor or a mixer; and/or the oxidation reactor (4) further comprises a supplemental cooler (23); and/or the cooling of the partially regenerated alkaline solution (11) obtained from the separator is by a heat exchanger.

12. The process for the regeneration of a spent alkaline solution as claimed in claim 1, in which the catalyst in the oxidation reactor is added to the alkaline solution at an inlet to the oxidation reactor in a manner such as to obtain a concentration of catalyst in the alkaline solution in the range of 10 to 500 ppm by weight.

13. The process for the regeneration of a spent alkaline solution as claimed in claim 1, in which the rise in temperature in a) is controlled by cooling by the cooled partially regenerated alkaline solution having a temperature of 35° C. or less.

14. A facility for the regeneration of a spent alkaline solution from a unit for the extraction of sulphur-containing compounds from a hydrocarbon cut, comprising:
   heating equipment (2) for heating the spent alkaline solution before it is introduced into the oxidation reactor to a temperature of 40° C. to 50° C.,
   an oxidation reactor (4) in which the spent alkaline solution is brought into contact with an oxidizing agent (5) and a catalyst (3),
   a separator (8) supplied with an effluent obtained from the oxidation reactor (4), from which a hydrocarbon phase which is rich in disulphides (10) and a partially regenerated alkaline solution are extracted, and
   a cooling means (14) for cooling the partially regenerated alkaline solution (11) obtained from the separator to a temperature of 45° C. or less forming a cooled partially regenerated alkaline solution,
   a conduit for injecting a portion of the cooled partially regenerated alkaline solution directly into the oxidation reactor (4) at one or more points, which cools to control a rise in the temperature of said reactor.

15. The facility for the regeneration of a spent alkaline solution as claimed in claim 14, further comprising a fresh alkaline solution supply.

16. The facility for the regeneration of a spent alkaline solution in claim 14, in which the conduit for injecting the excess alkaline solution directly into the oxidation reactor (4) is supplied with the cooled partially regenerated solution (22a) obtained by dividing the cooled partially regenerated alkaline solution (15) into two streams:
   a first stream (22a) which is the cooled partially regenerated alkaline solution returned to the oxidation reactor (4), and
   a second stream (22b).

17. The facility for the regeneration of a spent alkaline solution as claimed in claim 16, in which a supplemental cooling means is present to cool the cooled partially regenerated alkaline solution to a temperature which is at least 5° C. lower than that of the cooled partially regenerated alkaline solution (15).

18. The facility for the regeneration of a spent alkaline solution as claimed in claim 16, in which a supplemental heat exchanger or circulating reflux or jacket around the reactor is present.

19. The facility for the regeneration of a spent alkaline solution as claimed in claim 14, in which the oxidation reactor (4) comprises a supplemental cooling means (23).

20. A process for the regeneration of a spent alkaline solution from a unit for the extraction of sulphur-containing compounds from a hydrocarbon cut, comprising:
   a) sending the spent alkaline solution to an oxidation reactor (4) in which it is brought into contact with an oxidizing agent (5) and a catalyst (3), and optionally with a hydrocarbon cut, said spent alkaline solution having been heated to a temperature in the range of 40° C. to 50° C., and in which the rise in temperature is controlled by cooling by using a cooled partially regenerated alkaline solution,
   b) sending effluents from the oxidation reactor (4) to a separator (8) from which a hydrocarbon phase which is rich in disulphides (10) and a partially regenerated alkaline solution (11) are extracted, and
   c) cooling the partially regenerated alkaline solution (11) obtained from step b) to a temperature of 45° C. or less and then further cooling it to a temperature of 40° C. or less to obtain the cooled partially regenerated alkaline solution,
   wherein the cooled partially regenerated alkaline solution is supplied directly to said oxidation reactor at one or more points.

* * * * *